United States Patent Office 3,084,065
Patented Apr. 2, 1963

3,084,065
COATING COMPOSITION COMPRISING AN ORGANIC SOLVENT SOLUTION OF VINYL CHLORIDE-VINYLIDENE CHLORIDE COPOLYMER AND AN ALKYL ACRYLATE-ALKYL METHACRYLATE COPOLYMER AND BASE COATED THEREWITH
Henry J. Bach, Mount Lebanon Township, Allegheny County, Pa., assignor, by mesne assignments, to Martin-Marietta Corporation, Chicago, Ill., a corporation of Maryland
No Drawing. Filed Apr. 15, 1959, Ser. No. 806,428
11 Claims. (Cl. 117—75)

The present invention relates to improved vinyl chloride-vinylidene chloride copolymer containing coating compositions and particularly to such coating compositions adapted for application from solvent medium containing large amounts of aromatic hydrocarbon solvents. The invention is more particularly directed to improving the adhesion and water resistance of coatings produced by baking coating compositions of the above-indicated type. The invention is especially directed to the coating of sanitary cans and more particularly the coating of the interior surfaces of containers for food, beverages, and other products in which it is important that contact between the coating and the product packaged within the container not result in imparting undesirable flavor or odor to the product.

THE FIELD OF THE INVENTION

The development of improved sanitary coatings for food and beverage containers, and their closures, requires consideration of many special requirements which must be observed in regard to such coatings as well as overall consideration of economy.

A first requirement is good solubility in liquid aromatic hydrocarbon solvents, which are relatively inexpensive and available. Copolymers of vinyl chloride and vinyl acetate containing large amounts of vinyl chloride are well known for the coating of sanitary cans, but these copolymers require excessively large proportions of relatively expensive solvents such as ketones and similar active solvents for vinyl chloride resin. Since the solvent constitutes the major portion of the coating composition and since only a limited proportion of the resin is soluble without exceeding desirable coating viscosities, the cost factor which is involved will be appreciated.

In the United States Patent to Daniel M. Gray and George L. Reymann, No. 2,675,334, issued April 13, 1954, there is disclosed various copolymers of vinyl chloride and vinylidene chloride which are soluble in large amount in solvent medium comprising a high proportion of liquid aromatic hydrocarbon solvent. The coating composition set forth in Patent 2,675,334 are insufficiently adherent and lack adequate resistance to water at elevated temperature for some sanitary coating purposes.

The present invention is directed to modification of coating compositions of the type disclosed in Patent 2,675,334 to improve the adhesion of these coating compositions to surfaces and particularly to primed tinplate and preferably also to improve resistance to water at elevated temperature. The invention is particularly directed to modified coatings as above indicated in which the high solubility in liquid aromatic hydrocarbon solvent medium possessed by the unmodified vinyl chloride-vinylidene chloride copolymer is retained and which do not introduce undesirable flavor and odor imparting components.

THE INVENTION

In accordance with the present invention, it has been discovered that aromatic soluble vinyl chloride-vinylidene chloride copolymer resins may be improved by adding a minor amount of a low molecular weight, solvent-soluble copolymer of a minor weight proportion of lower alkyl acrylate with a major weight proportion of lower alkyl methacrylate. It has further been found that mixtures of resins specified above are mutually compatible in solvent medium containing a large amount of liquid aromatic hydrocarbon solvent and even in substantially pure liquid aromatic hydrocarbon solvent and that this compatibility is maintained upon deposition and baking of these solutions so that clear and uniform coatings may be achieved. It has still further been found that the coatings are essentially flavorless and odorless and adaptable for this reason to substantially all sanitary can coating situations.

THE VINYL CHLORIDE-VINYLIDENE CHLORIDE COPOLYMER COMPONENT

As previously indicated, the vinyl chloride-vinylidene chloride copolymers which are modified in accordance with the invention are the liquid aromatic hydrocarbon solvent-soluble copolymers containing from about 30% to about 75% by weight of vinyl chloride, the balance of the copolymer being vinylidene chloride, the copolymer having a specific viscosity within the range of about 0.12 to about 0.30 inclusive, as determined at 20° C. using a 0.4% solution of the copolymer in nitrobenzene. A specific viscosity below the stated range results in relatively brittle coatings, and above the stated range results in excessively high solution viscosity for the purposes of the invention. The copolymer should be substantially free of homopolymers of vinyl chloride and vinylidene chloride respectively, or copolymers thereof which are outside of the above-stated range of proportions. Thus, it is necessary to control the polymerization conditions, or to purify the copolymer by filtration or otherwise to insure that homopolymers and copolymers of improper composition are substantially excluded.

*Example I*

An example of a copolymer of vinyl chloride and vinylidene chloride which may be used in accordance with the invention is as follows:

82 parts of vinyl chloride and 18 parts of vinylidene chloride were placed together in a glass container at 20° C. and exposed with agitation to ultra-violet light. The ultra-violet light was provided with a 100 watt General Electric —7 mercury vapor lamp. After 36 to 72 hours of such treatment, the resulting mixture of copolymer and unreacted monomers was removed from the container and dried to remove the unreacted monomers. The copolymer obtained contained vinyl chloride in an amount of 60% by weight, the balance of the copolymer being vinylidene chloride. As will be evident, the vinylidene chloride entered the copolymer at a faster rate than the vinyl chloride. Copolymers with other ratios of vinyl chloride and vinylidene chloride content may be prepared in like manner by varying the proportion of monomers in the starting charge.

Other methods of producing a usable copolymer may be employed such as the above method without ultra-violet light but using a free-radical generating polymerization catalyst such as a peroxide, a persulfate, or an azo compound typified by benzoyl peroxide, and, if necessary to provide complete solubility in aromatic solvents such as xylene, with subsequent filtration to remove the homopolymers and copolymers in improper composition which are not soluble.

Examples of suitable commercially available copolymers of vinyl chloride and vinylidene chloride are Geon 222, which have vinyl chloride, vinylidene chloride ratios of substantially 60/40 and are useful for the purposes of the invention subject to the above-identified requirements of xylene solubility and of range of viscosity. The examples of "Geon 222" hereinafter referred to are those satisfying the said requirements.

THE MODIFIER COMPONENT

In accordance with the invention, there is incorporated in a solution preferably containing at least 18% by weight of the vinyl chloride-vinylidene chloride copolymer resins described hereinbefore in a solvent medium comprising a large proportion of liquid aromatic hydrocarbon solvent (preferably at least 75% by weight), a minor amount of a low molecular weight, aromatc solvent-soluble copolymer of a minor weight proportion of lower alkyl acrylate with a major weight proportion of lower alkyl methacrylate. The lower alkyl acrylate esters which are used are methyl acrylate and ethyl acrylate, the former being preferred. These confer adhesive character to the copolymer and improve adhesion of the coating to the underlying base.

Various lower alkyl methacrylate esters may be used either alone or in admixture with one another. Suitable methacrylate esters are esters of methacrylic acid with a lower alkanol to produce alkyl methacrylates illustrated by methyl, ethyl and butyl methacrylates. The lower alkyl methacrylates in major proportion confer additional toughness to the films which are produced, the quality of film toughness being of importance to adhesion, particularly under service conditions of fabrication and attack by water at elevated temperature.

The modifying copolymers contain from 10–50% by weight of lower alkyl acrylate and from 50–90% by weight of lower alkyl methacrylate.

The modifying copolymers which are employed in accordance with the invention possess relatively low molecular weight and are characterized by complete solubility in substantially pure liquid aromatic hydrocarbon solvent, e.g., toluene or xylene. To illustrate the extent of solubility in aromatic hydrocarbon solvent, preferred copolymers in accordance with the invention are soluble in toluene to an extent of about 40% by weight and possess a viscosity of from about about 480 to about 640 centipoises at 30° C. in such concentrated solutions.

The modifying copolymers of the present invention are generally of low molecular weight as indicated by a relative viscosity measured at 25° C. in a 1 gram per 100 ml. solvent solution in dimethyl formamide of at least 1.15 and less than about 2.0. Preferred copolymers have a molecular weight as indicated by a relative viscosity less than about 1.6 measured as above indicated.

Relative viscosity is determined in an Ostwald-Fenske viscosimeter and is computed as follows:

$$\text{Relative viscosity} \frac{\text{Solution efflux time}}{\text{Solvent efflux time}}$$

The relative viscosity is thus obtained by direct measurement. Specific viscosity may be derived by subtracting 1.0 from the relative viscosity.

COPOLYMER PRODUCTION

In order to produce the relatively low molecular weight modifying copolymers which are employed in the invention, the monomer components may desirably be dissolved in an organic solvent and copolymerization is effected in solution in the presence of a vinyl polymerizing catalyst.

The modifying copolymers of the invention may also be produced by various other copolymerization methods, such as by polymerization in bulk or in aqueous emulsion. Emulsion polymerization and polymerization in bulk normally produce copolymers of excessively high molecular weight, but these procedures may be conducted to provide copolymers having an average molecular weight exhibiting a relative viscosity within the range set forth hereinbefore which may be used to advantage in accordance with the present invention.

SOLVENT SOLUTION COPOLYMERIZATION

In solvent solution copolymerization, the monomeric reactants are dissolved in an organic solvent which is non-reactive with respect thereto, such as methyl ethyl ketone, and a free radical polymerization catalyst such as an organic peroxide or azo catalyst is incorporated in the solvent, generally in an amount of about 0.25–5.0% by weight based on the weight of the monomer components. The solution is then heated and maintained at an elevated temperature while the reactants combine to form a heat softenable solvent-soluble copolymer. The reaction is conveniently carried out by maintaining the solution at or near reflux temperature for several hours, e.g., 5–15 hours.

CATALYST

The modifying copolymer of the invention is preferably produced with the aid of a free radical polymerization catalyst in order to reduce the reaction time, but a catalyst is not essential to the reaction. Azodiisobutyronitrile and benzoyl peroxide are two examples of useful catalysts for the purpose, in proportions by weight of 0.25% to 5% of the combined weight of the monomer components. Other catalysts may be selected from known vinyl polymerizing catalysts, such as organic oxidizing agents which contain the peroxide linkage O—O, and azo compounds. It is preferred to use 1% by weight or more of catalyst since this leads to copolymers of lower molecular weight.

REACTION CONDITIONS

The temperature and pressure conditions for making the modifying copolymers of the invention are not precisely limited, but for practical purposes are in the range of −20° C. to 150° C. at atmospheric pressure. The time for making these copolymers can vary from a few minutes to several days, depending on the temperature and pressure, the yield sought, and the catalyst used, if any. While the yield can be carried above 90%, the invention does not require high yield of copolymers. Temperatures of about 70° C. or higher are preferred since these produce copolymers of lower molecular weight.

SOLVENT

The modifying copolymers of the invention are preferably produced with the aid of a non-reactive solvent since copolymerization in non-reactive organic solvent solution permits the achievement of a copolymer product of uniform composition and molecular weight. However, solvent is not essential to the copolymerization reaction.

Any organic solvent may be selected which is a good common solvent for the reactants in their original state, and for the completed copolymer, and which does not substantially prevent or enter into the copolymer-producing reaction. Examples of such solvents are the following, including mixtures thereof: aromatic hydrocarbon solvents such as benzene, toluene and xylene, ethyl benzene, isopropyl benzene and commercial mixed aromatic hydrocarbon solvents (mixed with more active solvents when using lower molecular weight acrylic and methacrylic esters) alcohols, such as ethylene glycol monobutyl ether, ethylene glycol monomethyl ether, diethylene glycol monobutyl ether, diethylene glycol monoethyl ether, and diethylene glycol monomethyl ether; ketones, such as methyl ethyl ketone, acetone and methyl isobutyl ketone; and such solvents as cyclohexanone, diacetone alcohol, dimethyl formamide, ethyl acetate and butyl propionate.

The modifying copolymers of the invention are illustrated in the following examples:

*Example II*

20 parts of methyl acrylate and 80 parts of ethyl methacrylate were dissolved in 100 parts of methyl ethyl ketone, 1% by weight of benzoyl peroxide was added and the solution copolymerized at 80° C. for ten hours to produce a copolymer having a composition corresponding with the proportions in the initial mixture of monomers. The copolymer was steam distilled to remove unreacted monomers and methyl ethyl ketone solvent and possessed a relative viscosity measured in the manner set forth hereinbefore of about 1.4.

*Example III*

Example II was repeated using: (1) ethyl acrylate instead of methyl acrylate; (2) methyl methacrylate instead of ethyl methacrylate; and, (3) butyl methacrylate in place of ethyl methacrylate. In each instance the copolymers produced were substantially the same as that produced in Example II and when used in admixture with copolymers of vinyl chloride and vinylidene chloride such as described hereinbefore produced susbtantially similar results of improved adhesion.

A commercially available copolymer resin similar to that set forth in Example II is a copolymer falling within the description of modifying copolymers in accordance with the invention and characterized in having a viscosity of 480–640 centipoises measured at 30° C. in a 40% solution in toluene, and a specific gravity of about 0.97 in 40% solids solution in toluene.

PROPORTION OF MODIFIER COPOLYMER IN COATING COMPOSITION

In accordance with the invention, there must be present in the aromatic hydrocarbon solvent solution of copolymers of vinyl chloride and vinylidene chloride at least about 3% by weight of a modifier copolymer of a minor weight proportion of lower alkyl acrylate with a major weight proportion of lower alkyl methacrylate as has been defined herein, said percentage being based on the mixture of copolymers. When 3% or more of the acrylate-methacrylate copolymer is present, the dry adhesion of baked coatings to a base and particularly to commercially primed tinplate is significantly improved.

Preferably, at least about 10% by weight of modifier copolymer based on the mixture of copolymers is employed in order to achieve a significant improvement in resistance to water at elevated temperatures. Specifically, and as evidenced by subjecting primed tinplate coated in accordance with the invention to water in both liquid and vapor forms at a temperature of 170° F. for 45 minutes, the adhesion of the coating to the primed tinplate base remains good.

For reasons of economy, the proportion of modifier copolymer in the mixture of copolymers should be less than about 20% by weight.

SOLVENT SOLUTION APPLICATION

In accordance with the invention coating is effected from a solvent solution in which the solvent is largely or preferably entirely constituted by liquid aromatic hydrocarbon solvent. Preferred aromatic solvents are mononuclear, such as benzene, toluene, xylene, ethyl benzene, and isomers and homologs thereof, these being useful either alone or in admixture with one another. Condensed aromatic solvents such as methyl naphthalene may also be employed either alone or in admixture with mononuclear aromatic hydrocarbons. Toluene and xylene are particularly preferred.

It is preferred in accordance with the invention to provide solvent solutions containing at least about 18% and preferably at least about 25% by weight of resin solids based on the weight of the solution. It will be appreciated that a slightly greater proportion of modifier copolymer may be included in the mixture of copolymers when the total proportion of resin solids in the solvent medium is reduced.

While it is preferred to employ a solvent medium consisting of liquid aromatic hydrocarbon solvent, the invention does not exclude the presence of small proportions, preferably not exceeding 25% and more preferably not exceeding 15% by weight based on the total weight of solvent, of more active solvents for vinyl resins. It will be observed, however, that since the present invention permits the attainment of 25% and higher resin solids in solvent solution mediums of suitable coating viscosity and consisting of aromatic hydrocarbon solvent, that the addition of more active solvents for vinyl resins such as ketones and ester solvents is not necessary.

Thus, minor amounts of ketone and ester solvents such as methyl ethyl ketone, methyl isobutyl ketone, cyclohexanone, isophorone, ethyl acetate and butyl propionate may be employed in special cases where it is desired to obtain even higher resin solids at a given viscosity than can be obtained with aromatic hydrocarbons alone, and where solvent cost is a minor consideration. It is emphasized, however, that the employment of ketones and and esters is not a necessary requirement for effectuating substantially complete solution of the resinous mixtures of the invention and that entirely acceptable coating solutions are obtained by the employment of aromatic hydrocarbon solvents alone.

The utilization of lower alcohols such as ethanol, isopropanol and butanol in an amount of up to about 1 or 2% for the purpose of clarifying the solvent solutions which are prepared is disclosed in the said Patent 2,675,334 and such small amounts of lower alcohols may be present for the same purpose in accordance with the present invention.

The solution coating compositions of the invention may be applied in any conventional manner as, for example, by dipping, roller coating, spraying, etc.

*Example IV*

23.8 parts of the copolymer vinyl chloride and vinylidene chloride produced in Example I and 1.2 parts of the acrylate-methacrylate copolymer produced in Example II were dissolved in 75 parts of toluene. The resulting solution containing 25% by weight of resin solids was clear and had a No. 4 Ford Cup viscosity at 80° F. of about 35 seconds. This solution was coated on commercially primed tinplate beverage container stock at 5–6 mg./sq. in. and baked 6–7 minutes at 300° F. The resulting baked coating was found to have good pasteurization blush resistance, excellent dry adhesion and the baked films were found to be essentially flavorless.

*Example V*

Example IV was repeated employing Geon 222 as the copolymer of vinyl chloride and vinylidene chloride in place of the copolymer of Example I. The Geon 222 employed contained 40% by weight of vinylidene chloride and 60% by weight of vinyl chloride. The copolymer was characterized by a specific viscosity of 0.15 determined at 20° C. in a 0.4% solution of pure nitrobenzene. The same results reported in Example IV were achieved in the present example.

*Example VI*

Examples IV and V were repeated using Acryloid B–72 in place of the acrylate-methacrylate copolymer of Example II, the Acryloid B–72 having a specific gravity of 0.97 and a viscosity of 580 centipoises, both measured at 30° C. in a 40% solution in toluene. The same results were again obtained. Similarly, using the copolymers of Example III in place of the copolymer of Example II, substantially the same results were obtained.

*Example VII*

Examples IV, V and VI were repeated utilizing 22.5 parts of copolymer of vinyl chloride and vinylidene chloride and 2.5 parts of modifier acrylate-methacrylate copolymer. Substantially the same results were achieved with the exception that the adhesion of the coating to the commercially primed tinplate following treatment of the coated base with water at a temperature of 170° F. for a period of about 45 minutes was greatly improved. The No. 4 Ford Cup viscosity at 80° F. of the solution containing 2.5 parts of acrylate-methacrylate copolymer was about 40 seconds.

The results which are achieved by the application of coatings having a film weight of 5–6 mgs./sq. in. from 25% resin solids solution in toluene over commercially primed tinplate followed by baking for from 6–7 minutes at 300° F. as the proportion of modifier copolymer is increased is illustrated in Table I which follows:

TABLE I

| Resin Composition | | Dry Adhesion (Scotch Tape) | Pasteurization Resistance | | Flavor |
|---|---|---|---|---|---|
| Copolymer, Example I | Copolymer, Example II | | Blush | Wet Adhesion | |
| 100 | 0 | 0–2 | 7–9 | 0 | none |
| 98 | 2 | 0–2 | 7–9 | 0 | none |
| 95 | 5 | 8–10 | 8–10 | 0 | none |
| 90 | 10 | 8–10 | 7–9 | 8–10 | none |
| 85 | 15 | 8–10 | 8–9 | 8–10 | none |

All of the solutions tested in Table I were clear and no evidence of incompatibility either in the solution or in the resulting baked film was noted.

The coatings of the invention may be applied to various metal surfaces, such as iron (blackplate), tin (electrolytic tinplate) or aluminum but is preferably applied over a primed surface. Various conventional primers known to the art may be used, but it is preferred to employ as the primer the reaction product obtained by cooking an unsaturated hydrocarbon resin produced by distilling the gummy polymer residue obtained during the cracking of hydrocarbon fractions in gasoline production and having a molecular weight in the range of 450–750, a softening point of about 190–240° F. and an iodine number of about 100–200 with a drying oil, preferably a frosting drying oil. Suitable drying oils are linseed oil, soya oil and tung oil. Drying oils containing conjugated double bonds such as dehydrated castor oil are preferred. From 40–75 parts of the drying oil are cooked with from 25–60 parts of the unsaturated hydrocarbon resin, preferably at a temperature in excess of about 500° F. until a clear solution as evidenced by the clarity of a cooled bead is obtained.

The commercial primer used in Table I was of the character referred to above and is produced by reacting 60 parts of dehydrated castor oil with 40 parts of an unsaturated hydrocarbon resin having a molecular weight average of about 668, a softening point of about 200–220° F. and an iodine number of 150, reaction being effected in a varnish kettle by heating with agitation at 575° F. for a period of from 45–60 minutes to produce a clear compatible mixture. The reaction mixture is then cooled and thinned with 95 parts of mineral spirits and 1.6 parts of 6% iron naphthenate dryer was then added. This primer composition was applied to the tinplate used in Table I to provide a film weight of 2–3 mgs./sq. in., and the primer was baked upon the tinplate for 10 minutes at 400° F.

It will be understood that the invention is not limited to the specific formulas and ingredients recited in the foregoing examples and that pigments, dyes, waxes and other similar ingredients may be added to the otherwise clear compositions to provide decorative and similar effects without departing from the scope of the invention.

The invenion is defined in the claims which follow.

I claim:

1. A coating composition comprising a compatible organic solvent solution of a copolymer of vinyl chloride and vinylidene chloride and a copolymer of a minor weight proportion of lower alkyl acrylate ester, in which the alkyl group contains from 1 to 2 carbon atoms, with a major weight proportion of a lower alkyl methacrylate ester, in which the alkyl group contains from 1 to 4 carbon atoms, dissolved in a solvent medium comprising at least 75% by weight of liquid aromatic hydrocarbon solvent, said copolymer of vinyl chloride and vinylidene chloride containing from about 30% to about 75% by weight of vinyl chloride with the balance of the copolymer being vinylidene chloride and having a specific viscosity of about 0.12 to about 0.30 measured in a 0.4% solution of the copolymer in nitrobenzene and being substantially free of homopolymers of vinyl chloride and vinylidene chloride and of copolymers thereof outside of the stated range of proportions and thereby being completely soluble in a 25% by weight solution thereof in toluene, said copolymer of acrylate ester and methacrylate ester comprising from 10–50% by weight of said alkyl acrylate ester and from 50–90% by weight of said alkyl methacrylate ester and having a relative viscosity measured in a 1.0% by weight solution of the copolymer in dimethyl formamide of from 1.15 to 2.0, said copolymer of acrylate ester and methacrylate ester being present in admixture with said copolymer of vinyl chloride and vinylidene chloride in an amount of at least about 3% by weight up to about 20% by weight based on the weight of the mixture of copolymers.

2. A coating composition as recited in claim 1 in which said solution contains at least about 18% by weight of said copolymers dissolved therein.

3. A coating composition as recited in claim 1 in which said solution contains at least about 25% by weight of said copolymers dissolved therein.

4. A coating composition as recited in claim 1 in which said solvent medium consists substantially of liquid aromatic hydrocarbon solvent and said solution contains at least about 18% by weight of said copolymers dissolved therein.

5. A coating composition as recited in claim 4 in which said liquid aromatic hydrocarbon solvent is mononuclear.

6. A coating composition as recited in claim 4 in which said liquid aromatic hydrocarbon solvent is selected from the group consisting of benzene, toluene, xylene, ethyl benzene and mixtures thereof.

7. A coating composition as recited in claim 1 in which said copolymer of acrylate ester and methacrylate ester has a relative viscosity less than 1.6.

8. A coating composition as recited in claim 1 in which said copolymer of vinyl chloride and vinylidene contains about 60% by weight of vinyl chloride and about 40% by weight of vinylidene chloride.

9. A coating composition as recited in claim 1 in which said copolymer of acrylate ester and methacrylate ester contains about 40% by weight of methyl acrylate and about 60% by weight of ethyl methacrylate.

10. A coated product comprising a base having a baked film adhered to a surface thereof, said film comprising a homogeneous mixture of a copolymer of vinyl chloride and vinylidene chloride containing from about 30% to about 75% by weight of vinyl chloride and with the balance of the copolymer being vinylidene chloride and being substantially free of homopolymers of vinyl chloride and vinylidene chloride and of copolymers thereof outside of the stated range of proportions, and at least about 3% up to about 20% by weight based on the total weight of the mixture of a copolymer of from 10–50% by weight of lower alkyl acrylate ester in which the alkyl group contains from 1 to 2 carbon atoms and from 50–90% by weight of lower alkyl methacrylate ester in which the alkyl group contains from 1 to 4 carbon atoms.

11. A coated product comprising tinplate primed with an unsaturated hydrocarbon resin-drying oil primer in which the hydrocarbon resin has an average molecular weight in the range of 450–750, a softening point of from 190–240° F. and an iodine number of from 100–200, and a baked film adhered to said primer, said film comprising a homogeneous mixture of a copolymer of vinyl chloride and vinylidene chloride containing from about 30% to about 75% by weight of vinyl chloride and with the balance of the copolymer being vinylidene chloride and being substantially free of homopolymers of vinyl chloride and vinylidene chloride and of copolymers thereof outside of the stated range of proportions, and at least about 3% up to about 20% by weight based on the total weight of the mixture of a copolymer of from 10–50% by weight of lower alkyl acrylate ester in which the alkyl group contains from 1 to 2 carbon atoms and from 50–90% by weight of lower alkyl methacrylate ester in which the alkyl group contains from 1 to 4 carbon atoms.

References Cited in the file of this patent

UNITED STATES PATENTS

| | | |
|---|---|---|
| 2,366,414 | Lindh | Jan. 2, 1945 |
| 2,431,078 | Powell et al. | Nov. 18, 1947 |
| 2,462,029 | Perry | Feb. 15, 1949 |
| 2,675,334 | Gray et al. | Apr. 13, 1954 |
| 2,892,804 | Crissey | June 30, 1959 |
| 2,944,037 | Clark | July 5, 1960 |